(12) United States Patent
Fouchard et al.

(10) Patent No.: US 10,717,918 B2
(45) Date of Patent: Jul. 21, 2020

(54) INJECTION SYSTEM FOR CONTROLLED DELIVERY OF SOLID OIL FIELD CHEMICALS

(71) Applicant: Ecolab USA Inc., St. Paul, MN (US)

(72) Inventors: David Marc Daniel Fouchard, Sugar Land, TX (US); Denise Lynn Gibson, Katy, TX (US); Saugata Gon, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/987,686

(22) Filed: May 23, 2018

(65) Prior Publication Data

US 2018/0340115 A1    Nov. 29, 2018

Related U.S. Application Data

(60) Provisional application No. 62/509,977, filed on May 23, 2017.

(51) Int. Cl.
| | |
|---|---|
| *E21B 37/06* | (2006.01) |
| *E21B 41/00* | (2006.01) |
| *E21B 41/02* | (2006.01) |
| *E21B 43/16* | (2006.01) |
| *C09K 8/524* | (2006.01) |

(Continued)

(52) U.S. Cl.
CPC ............. *C09K 8/54* (2013.01); *B02C 23/00* (2013.01); *C09K 8/524* (2013.01); *C09K 8/528* (2013.01); *C09K 8/588* (2013.01); *E21B 21/00* (2013.01); *E21B 37/06* (2013.01); *E21B 41/00* (2013.01); *E21B 41/02* (2013.01); *E21B 43/16* (2013.01); *C09K 2208/20* (2013.01); *C09K 2208/22* (2013.01); *C09K 2208/32* (2013.01)

(58) Field of Classification Search
CPC .......... E21B 37/06; E21B 41/00; E21B 41/02; E21B 43/16; B02C 23/00; C09K 8/524; C09K 8/528; C09K 8/54; C09K 8/588
See application file for complete search history.

(56) References Cited

U.S. PATENT DOCUMENTS

| | | | |
|---|---|---|---|
| 2,364,222 | A | 12/1944 | Kaufman |
| 2,599,385 | A | 6/1952 | Gross et al. |

(Continued)

FOREIGN PATENT DOCUMENTS

| | | |
|---|---|---|
| CA | 2839611 A1 | 7/2015 |
| CN | 1487048 A | 4/2004 |

(Continued)

OTHER PUBLICATIONS

Brown, J. Mike, et al., Laboratory and Field Studies of Long-term Release Rates for a Solid Scale Inhibitor, SPE 140177 SPE International (2011) Society of Petroleum Engineers, 7 pages.

(Continued)

*Primary Examiner* — Matthew R Buck
(74) *Attorney, Agent, or Firm* — Stinson LLP

(57) ABSTRACT

Systems, methods and apparatus for injecting a solid chemical for inhibiting, decreasing or preventing precipitation and/or deposition of foulants and/or contaminants in oilfield tubulars. The use of solid chemicals or highly viscous fluids providing ease of shipment, greater economy in storage, shipment and delivery and increased ease of use.

18 Claims, 1 Drawing Sheet

(51) Int. Cl.
*C09K 8/528* (2006.01)
*C09K 8/54* (2006.01)
*C09K 8/588* (2006.01)
*E21B 21/00* (2006.01)
*B02C 23/00* (2006.01)

(56) References Cited

U.S. PATENT DOCUMENTS

| | | | |
|---|---|---|---|
| 2,836,559 A | 5/1958 | Bock et al. | |
| 3,355,315 A | 11/1967 | Jorda et al. | |
| 3,390,085 A | 6/1968 | Floeck | |
| 3,454,379 A | 7/1969 | Isaacson et al. | |
| 3,531,409 A | 9/1970 | Seffens et al. | |
| 3,563,315 A | 2/1971 | Claytor, Jr. et al. | |
| 3,600,311 A | 8/1971 | Naiman et al. | |
| 3,623,979 A | 11/1971 | Maddox, Jr. et al. | |
| 3,629,104 A | 12/1971 | Maddox, Jr. | |
| 3,640,824 A | 2/1972 | Bucaram et al. | |
| 3,661,541 A | 5/1972 | Hollyday, Jr. | |
| 3,669,189 A | 6/1972 | Fischer | |
| 3,682,249 A | 8/1972 | Fischer et al. | |
| 3,724,553 A | 4/1973 | Snavely, Jr. et al. | |
| 3,776,247 A | 12/1973 | Choufoer et al. | |
| 3,840,352 A | 10/1974 | Scheffel | |
| 3,841,850 A | 10/1974 | Aaron et al. | |
| 3,879,177 A | 4/1975 | Andress, Jr. | |
| 3,926,579 A | 12/1975 | Rossi et al. | |
| 3,951,161 A | 4/1976 | Rohrback et al. | |
| 4,011,906 A | 3/1977 | Alexander et al. | |
| 4,045,360 A | 8/1977 | Fischer et al. | |
| 4,076,728 A | 2/1978 | Maulding | |
| 4,110,283 A | 8/1978 | Capelle | |
| 4,175,926 A | 11/1979 | Wisotsky | |
| 4,214,876 A | 7/1980 | Garth et al. | |
| 4,238,451 A | 12/1980 | Ciais et al. | |
| 4,388,214 A | 6/1983 | Oppenlaender et al. | |
| 4,412,451 A | 11/1983 | Uusitalo et al. | |
| 4,509,360 A | 4/1985 | Erwin et al. | |
| 4,509,951 A | 4/1985 | Knapp | |
| 4,511,366 A | 4/1985 | Burrows et al. | |
| 4,518,509 A | 5/1985 | Newberry | |
| 4,538,682 A | 9/1985 | McManus et al. | |
| 4,582,131 A | 4/1986 | Plummer et al. | |
| 4,588,640 A | 5/1986 | Matlach | |
| 4,645,585 A | 2/1987 | White | |
| 4,652,611 A | 3/1987 | Kuroda et al. | |
| 4,654,050 A | 3/1987 | Koch et al. | |
| 4,659,334 A | 4/1987 | Matlach | |
| 4,670,516 A | 6/1987 | Sackmann et al. | |
| 4,684,469 A | 8/1987 | Pedersen et al. | |
| 4,693,312 A | 9/1987 | Lenderman | |
| 4,706,509 A | 11/1987 | Riebel | |
| 4,737,159 A | 4/1988 | Phillips | |
| 4,767,545 A | 8/1988 | Karydas et al. | |
| 4,790,666 A | 12/1988 | Koziol | |
| 4,843,247 A | 6/1989 | Yamazoe et al. | |
| 4,896,726 A | 1/1990 | Ayres | |
| 4,900,331 A | 2/1990 | Le | |
| 4,925,497 A | 5/1990 | Theirheimer, Jr. | |
| 4,986,353 A | 1/1991 | Clark et al. | |
| 4,997,580 A | 3/1991 | Karydas et al. | |
| 5,039,432 A | 8/1991 | Ritter et al. | |
| 5,062,992 A | 11/1991 | McCullough | |
| 5,087,376 A | 2/1992 | Bendiksen et al. | |
| 5,103,031 A | 4/1992 | Smith, Jr. | |
| 5,103,914 A * | 4/1992 | LaHaye | E21B 41/02 |
| | | | 166/310 |
| 5,104,556 A | 4/1992 | Al-Yazdi | |
| 5,121,629 A | 6/1992 | Alba | |
| 5,124,059 A | 6/1992 | Koch et al. | |
| 5,132,225 A | 7/1992 | Dickakian | |
| 5,209,298 A * | 5/1993 | Ayres | E21B 33/068 |
| | | | 166/305.1 |
| 5,209,300 A * | 5/1993 | Ayres | E21B 33/068 |
| | | | 166/305.1 |
| 5,209,301 A * | 5/1993 | Ayres | E21B 33/068 |
| | | | 166/305.1 |
| 5,263,539 A | 11/1993 | Salimi et al. | |
| 5,409,713 A | 4/1995 | Lokkesmoe et al. | |
| 5,420,040 A | 5/1995 | Anfindsen et al. | |
| 5,431,236 A | 7/1995 | Warren | |
| 5,453,188 A | 9/1995 | Florescu et al. | |
| 5,503,645 A | 4/1996 | Jung et al. | |
| 5,546,792 A | 8/1996 | Becker | |
| 5,674,538 A | 10/1997 | Lokkesmoe et al. | |
| 5,683,724 A | 11/1997 | Hei et al. | |
| 5,750,070 A | 5/1998 | Tang et al. | |
| 5,969,237 A | 10/1999 | Jones et al. | |
| 6,111,261 A | 8/2000 | Bolza-Schunemann et al. | |
| 6,180,683 B1 | 1/2001 | Miller et al. | |
| 6,204,420 B1 | 3/2001 | Miller et al. | |
| 6,206,103 B1 | 3/2001 | Zaid et al. | |
| 6,213,214 B1 | 4/2001 | Zaid et al. | |
| 6,270,653 B1 | 8/2001 | Gochin et al. | |
| 6,313,367 B1 | 11/2001 | Breen | |
| 6,369,004 B1 | 4/2002 | Klug et al. | |
| 6,401,538 B1 | 6/2002 | Han et al. | |
| 6,481,268 B1 | 11/2002 | Povey et al. | |
| 6,491,824 B1 | 12/2002 | Lin et al. | |
| 6,544,932 B2 | 4/2003 | Klug et al. | |
| 6,656,353 B2 | 12/2003 | Kilawee et al. | |
| 6,698,277 B2 | 3/2004 | Povey et al. | |
| 6,776,188 B1 * | 8/2004 | Rajewski | B01F 5/0471 |
| | | | 137/624.13 |
| 6,796,195 B2 | 9/2004 | Povey et al. | |
| 6,814,885 B2 | 11/2004 | Woodward et al. | |
| 6,839,137 B2 | 1/2005 | Mason et al. | |
| 6,843,982 B1 | 1/2005 | Arnaud et al. | |
| 6,925,392 B2 | 8/2005 | McNeil, III et al. | |
| 6,946,524 B2 | 9/2005 | Breuer et al. | |
| 6,959,588 B2 | 11/2005 | Zougari et al. | |
| 7,010,979 B2 | 3/2006 | Scott | |
| 7,049,272 B2 | 5/2006 | Sinclair et al. | |
| 7,079,242 B2 | 7/2006 | Bordelon | |
| 7,097,759 B2 | 8/2006 | Mukkamala | |
| 7,114,375 B2 | 10/2006 | Panetta et al. | |
| 7,122,112 B2 | 10/2006 | Mukkamala et al. | |
| 7,122,113 B2 | 10/2006 | Cornelisse | |
| 7,179,384 B2 | 2/2007 | Moriarty et al. | |
| 7,213,445 B2 | 5/2007 | Wu et al. | |
| 7,223,603 B2 | 5/2007 | Rovani, Jr. et al. | |
| 7,252,096 B2 | 8/2007 | Gill et al. | |
| 7,402,252 B2 | 7/2008 | Kadlec et al. | |
| 7,455,111 B2 | 11/2008 | Qu et al. | |
| 7,479,490 B2 * | 1/2009 | Adams | B01F 1/0033 |
| | | | 424/489 |
| 7,493,955 B2 | 2/2009 | Gupta et al. | |
| 7,537,705 B2 * | 5/2009 | Voeller | C02F 5/10 |
| | | | 134/25.1 |
| 7,541,315 B2 | 6/2009 | Jennings | |
| 7,542,139 B2 | 6/2009 | Bordelon | |
| 7,569,150 B2 | 8/2009 | Kilawee et al. | |
| 7,628,060 B2 | 12/2009 | Horsup | |
| 7,632,412 B2 | 12/2009 | Johnson et al. | |
| 7,638,067 B2 | 12/2009 | Hilgren et al. | |
| 7,666,312 B2 | 2/2010 | Hicks | |
| 7,670,993 B2 | 3/2010 | Dyer | |
| 7,736,522 B2 | 6/2010 | Kilawee et al. | |
| 7,740,399 B2 | 6/2010 | Simmons et al. | |
| 7,754,657 B2 | 7/2010 | Trimble et al. | |
| 7,772,160 B2 | 8/2010 | Greaves et al. | |
| 7,776,930 B2 | 8/2010 | Ubbels | |
| 7,776,931 B2 | 8/2010 | Venter et al. | |
| 7,857,871 B2 | 12/2010 | Martin et al. | |
| 7,871,521 B2 | 1/2011 | Monsrud et al. | |
| 7,875,464 B2 | 1/2011 | Schabron et al. | |
| 7,910,371 B2 | 3/2011 | Johnson | |
| 7,951,298 B2 | 5/2011 | Hicks et al. | |
| 7,984,642 B2 | 7/2011 | Africk et al. | |
| 7,993,579 B2 | 8/2011 | Williams et al. | |
| 7,994,103 B2 | 8/2011 | Campbell et al. | |
| 8,012,758 B2 | 9/2011 | Enzien et al. | |
| 8,153,057 B2 | 4/2012 | Hicks et al. | |
| 8,241,920 B2 | 8/2012 | Schabron et al. | |

(56) References Cited

U.S. PATENT DOCUMENTS

| | | | |
|---|---|---|---|
| 8,273,581 | B2 | 9/2012 | Schabron et al. |
| 8,349,772 | B2 | 1/2013 | Notte et al. |
| 8,367,425 | B1 | 2/2013 | Schabron et al. |
| 8,492,154 | B1 | 7/2013 | Schabron et al. |
| 8,530,240 | B1 | 9/2013 | Schabron et al. |
| 8,584,513 | B2 | 11/2013 | Hough et al. |
| 8,628,970 | B1 | 1/2014 | Schabron et al. |
| 8,632,742 | B2 | 1/2014 | Keiser et al. |
| 8,636,918 | B2 | 1/2014 | Silvernail et al. |
| 8,695,707 | B2 | 4/2014 | Li et al. |
| 8,771,593 | B2 | 7/2014 | Hicks et al. |
| 8,945,476 | B2 | 2/2015 | Carroll et al. |
| 8,980,173 | B2 | 3/2015 | Fox et al. |
| 8,992,780 | B2 | 3/2015 | Champion et al. |
| 9,056,268 | B2 | 6/2015 | Jones et al. |
| 9,108,935 | B2 | 8/2015 | Hernandez Altamirano et al. |
| 9,127,213 | B2 | 9/2015 | Komalarajun et al. |
| 9,150,472 | B2 | 10/2015 | Huo et al. |
| 9,193,610 | B2 | 11/2015 | Smith et al. |
| 9,221,803 | B2 | 12/2015 | Mena Cervantes et al. |
| 9,243,814 | B2 | 1/2016 | Hicks et al. |
| 9,266,120 | B2 | 2/2016 | Counter et al. |
| 9,282,260 | B2 | 3/2016 | Respini |
| 9,303,488 | B2 | 4/2016 | Kanstad |
| 9,309,750 | B2 * | 4/2016 | Coonrod .............. E21B 33/068 |
| 9,528,350 | B2 | 12/2016 | Lunde et al. |
| 2003/0041508 | A1 | 3/2003 | Handa et al. |
| 2003/0079879 | A1 | 5/2003 | Grainger et al. |
| 2003/0149210 | A1 | 8/2003 | Hurtevent et al. |
| 2003/0171221 | A1 | 9/2003 | Feustel et al. |
| 2005/0239662 | A1 | 10/2005 | Patel |
| 2006/0231254 | A1 * | 10/2006 | Peskunowicz ........ B01F 5/0496 166/278 |
| 2010/0027371 | A1 | 2/2010 | Lucas et al. |
| 2010/0130385 | A1 | 5/2010 | Guzmann et al. |
| 2010/0243252 | A1 | 9/2010 | Luharuka et al. |
| 2011/0062058 | A1 | 3/2011 | Rogel et al. |
| 2011/0066441 | A1 | 3/2011 | Ovalles et al. |
| 2012/0217012 | A1 * | 8/2012 | Darby .................... E21B 37/06 166/305.1 |
| 2012/0293186 | A1 | 11/2012 | Duval et al. |
| 2013/0220616 | A1 | 8/2013 | Seth et al. |
| 2013/0264289 | A1 | 10/2013 | Notte et al. |
| 2013/0288934 | A1 | 10/2013 | Powell et al. |
| 2014/0027121 | A1 | 1/2014 | Jackson et al. |
| 2014/0110425 | A1 * | 4/2014 | Pahl ..................... E21B 21/062 222/1 |
| 2014/0217033 | A1 | 8/2014 | Lucente-Schultz et al. |
| 2014/0260567 | A1 | 9/2014 | Fouchard et al. |
| 2014/0263078 | A1 | 9/2014 | Gill et al. |
| 2014/0374102 | A1 | 12/2014 | Smith |
| 2015/0027955 | A1 | 1/2015 | Coleman et al. |
| 2015/0133349 | A1 | 5/2015 | Brooks et al. |
| 2015/0204165 | A1 | 7/2015 | Yeung et al. |
| 2015/0259230 | A1 | 9/2015 | Li et al. |
| 2017/0009557 | A1 | 1/2017 | Harman et al. |
| 2017/0145788 | A1 * | 5/2017 | Fouchard ................ E21B 37/06 |

FOREIGN PATENT DOCUMENTS

| | | |
|---|---|---|
| CN | 1220749 C | 9/2005 |
| CN | 101768430 A | 7/2010 |
| CN | 101781767 A | 7/2010 |
| CN | 202152667 U | 2/2012 |
| CN | 204460665 U | 7/2015 |
| CN | 205714106 U | 12/2016 |
| DE | 2612757 A1 | 9/1977 |
| EP | 2 660 298 A1 | 11/2013 |
| JP | 2002361115 A * | 12/2002 |
| WO | 2016/053288 A1 | 4/2016 |
| WO | 2016/174413 A1 | 11/2016 |
| WO | 2016/174414 A1 | 11/2016 |
| WO | 2016/187672 A1 | 12/2016 |

OTHER PUBLICATIONS

Halliburton Communications, Product Enhancement, Paraffin and Asphaltene Control (2005), 4 pages.

Kumar, Deepak et al., Scale Inhibition using Nano-silica Particles, SPE 149321 SPE International (2012) Society of Petroleum Engineers, 7 pages.

Smith, Tony et al., Solid Paraffin Inhibitor Pumped in a Hydraulic Fracture Provides Long-Term Paraffin Inhibition in Permian Basin Wells, SPE 124868 SPE International (2009) Society of Petroleum Engineers, 10 pages.

Szymczak, Stephen et al., Well Stimulation Using a Solid, Proppant-Sized, Paraffin Inhibitor to Reduce Costs and Increase Production for a South Texas, Eagle Ford Shale Oil Operator, SPE 168169 SPE International (2014) Society of Petroleum Engineers, 6 pages.

Willmon J.G. et al., From Precommissioning to Startup: Getting Chemical Injection Right, Society of Petroleum Engineers (2006), pp. 483-491.

Baker Hughes, Material Safety Data Sheet dated Oct. 10, 2012, 7 pages.

Chongqing Weiyun Technology Development Co., Ltd., Xmas Tree Downhole Chemical Injection Skid Equipment (http://cqweiyun.en.alibaba.com/product/1801490323-801123600), Jun. 8, 2015, 6 pages.

Product Data Sheet for Elvax for Industrial & Consumer Products (2016), 2 pages.

DuPont Elvax EVA copolymer resins Grade Selection Guide (2015), 4 pages.

LEDA Egypt Company, ISO 9001:2008 Manufacturing of Chemical Injection Skids, Issue 1, Apr. 8, 2015, 17 pages.

International Search Report and Written Opinion dated Sep. 7, 2018 relating to PCT Patent Application No. PCT/US2018/034113, 12 pages.

International Search Report and Written Opinion dated Nov. 2, 2018 relating to PCT Patent Application No. PCT/US2018/034126, 12 pages.

Extended European Search Report dated Apr. 16, 2019 relating to European Patent Application No. 16867201.2, 9 pages.

* cited by examiner

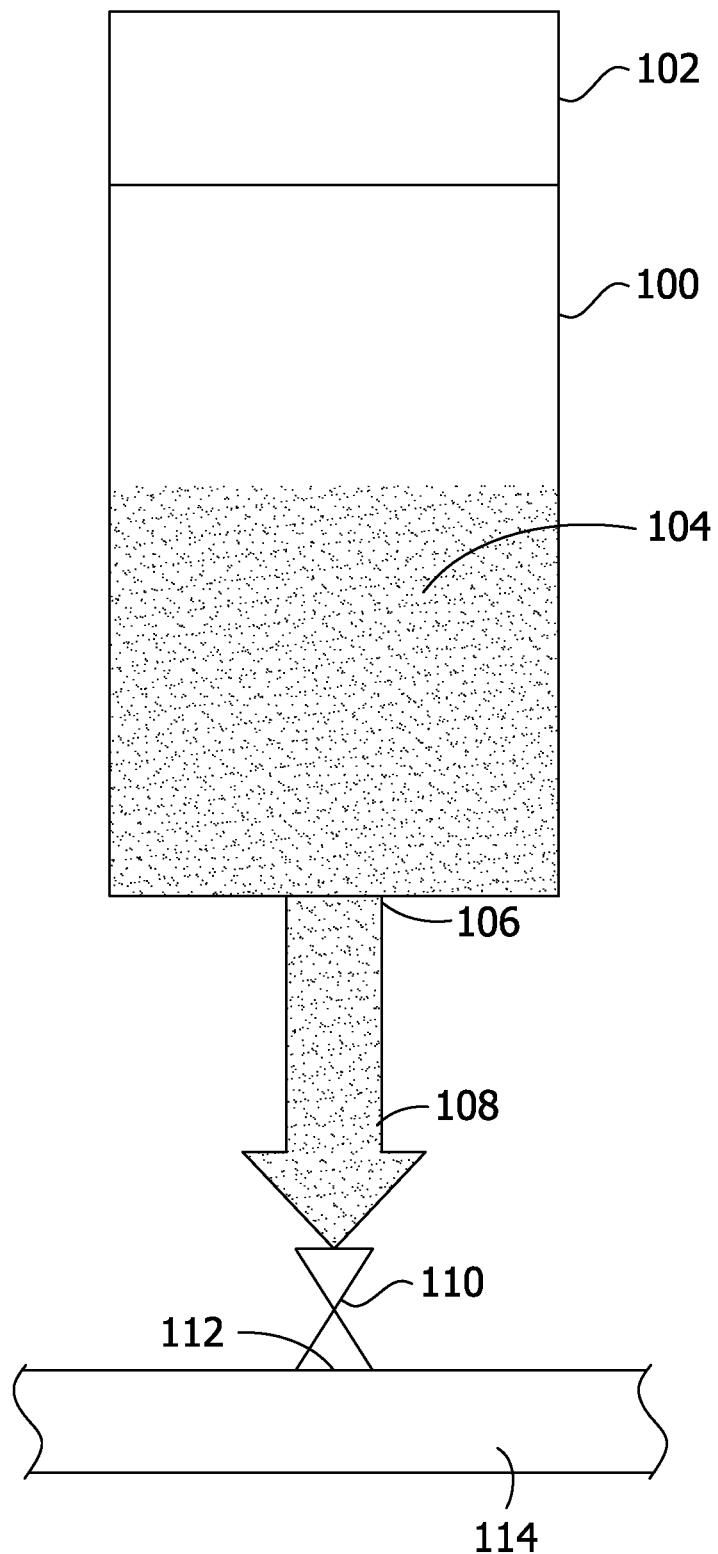

INJECTION SYSTEM FOR CONTROLLED DELIVERY OF SOLID OIL FIELD CHEMICALS

CROSS-REFERENCE TO RELATED APPLICATION

This application claims priority to U.S. Provisional Patent Application Ser. No. 62/509,977 filed on May 23, 2017, the disclosure of which is incorporated herein by reference in its entirety.

FIELD OF THE INVENTION

Systems, methods and apparatus for injecting a solid chemical for inhibiting, decreasing or preventing precipitation and/or deposition of foulants and/or contaminants and/or corrosion and/or the modification of the physical characteristics of the production fluid in oilfield tubulars. Solid chemicals used herein may include paraffin inhibitors, dispersants, asphaltene inhibitors and dispersants, scale inhibitors and dispersants, and corrosion inhibitors. The use of solid chemicals providing ease of shipment, greater economy in storage, shipment and delivery and increased ease of use.

BACKGROUND OF THE INVENTION

Crude oil from geological formations can contain a variety of contaminants and foulants, including solid impurities, gasses and minerals. Solid contaminants and foulants can include waxes, asphaltenes, and various hydrates, while contaminating minerals can include sulfur, iron, vanadium, zinc and various mineral/inorganic salts, such as Barite (Barium sulfate), Calcite (Calcium carbonate) and Halite (Sodium chloride). When crude oil is pumped from a formation and transported via drilling and production tubulars and transmission pipelines, these contaminants can precipitate out due to changes in pressure and temperature. This can result in the deposition of such contaminants throughout the system of drilling and production tubulars and pipelines. As these various deposits buildup, they can occlude the various tubulars and deposit on inner surfaces of flow lines, valves and pumps, greatly reducing the pumping efficiency and flow of oil through the drilling, production and tubular systems.

Traditionally, the problem of contaminant buildup has been addressed by various methods including drilling or re-boring of the affected tubular to cut the contaminant buildup from the interior of the pipeline; using chemical solvents to dissolve the various contaminants; using dispersing agents, including surfactants, to obstruct adherence to tubular walls; using hot oil, hot water, or steam to melt the deposits; and using chemical inhibitors in attempts to prevent deposition of foulants. However, each method of addressing contaminant buildup does have its limitations and can involve substantive cost and production downtime.

As an example, crude oil contaminants can be unique for each oil deposit and oil well. Consequently, chemical solvents and methods to remediate such contaminants can be unique to each oil well. Each specific type of contaminant can require a distinct formulation and carrier fluid/solvent for effective application. For example, paraffins are soluble in straight chain alkanes such as hexane and heptane, while asphaltenes are high molecular weight aromatic ring structures and are soluble in aromatic solvents such as xylene and toluene. Also, corrosion inhibitors can include amines, ammonia, and morpholine, while scale dissolvers can include hydrochloric acid or ethylenediamine tetraacetic acid (depending on the kind of mineral causing the scale). Determination of the specific contaminant and determination, formulation and transport of an appropriate treatment can be complex and time consuming.

As currently used, active compounds in these solvents are formulated in a carrier fluid/solvent for ease of delivery or injection into the subject product stream with a simple injection pump. While the use of such chemical additives has shown some effectiveness in inhibiting contaminant depositions, the use of such liquid or solvent based inhibitors greatly increases the cost of transport, storage, and safety of various inhibitor compounds. This is at least due in part to the large volume of solvent needed to maintain the inhibitor in a liquid state, the volatility of the solvent and the noxious nature of many of the solvents.

One system for overcoming these issues comprises the use of a solid chemical as a foulant and/or contaminant inhibitor. The use of a solid chemical allows for great reduction in transport, storage, and safety costs. However, a problem exists wherein the solid chemical is not readily flowable. Therefore, a need exists for an efficient, safe, and economical system to provide solid chemicals directly into a process production line in a continuous and/or calculated manner.

BRIEF SUMMARY OF THE INVENTION

Systems, apparatus, and methods are provided that allow for chemicals in solid phase to be used on-site in crude oil applications to remediate, inhibit and/or decrease precipitation or deposits of foulants and/or contaminants to maintain or restore or improve flow in oilfield tubulars, fittings, wellheads, wellbores, surface equipment and the like, without the need for the production and shipment of such chemical in liquid phase and with minimum energy use. Examples of such foulants and contaminants can include paraffins, asphaltenes, corrosive products, and minerals that result in scales. Examples of useful types of chemicals include inhibitors, dispersants, and chemical additives to change the physical properties of the fluid, such as paraffin inhibitors and dispersants, asphaltene inhibitors and dispersants, scale inhibitors and dispersants, corrosion inhibitors, and the like.

Chemicals useful in such crude oil applications and that are generally solid at ambient temperatures and pressures (approximately 20° C. and 1 atm) are obtained in solid form. Using a chemical delivery system, the solid chemical is subjected to a size reduction apparatus wherein the solid chemical becomes readily flowable and is introduced into the oilfield tubulars in a desired quantity or flow rate.

Disclosed herein is a system for distribution of solid chemicals into an oil field production line, comprising a solid chemical tank wherein at least a portion of the solid chemicals are contained therein; a solid chemical size reduction apparatus wherein the solid chemical size reduction apparatus reduces the size of the solid chemical flowing from the exit of the solid chemical tank, thereby producing size-reduced solid chemicals; a valve for controlling the distribution rate of the size-reduced solid chemicals flowing from the solid chemical size reduction apparatus into the oil field production line; a solid chemical injection point on the oil field production line wherein the size-reduced solid chemicals are injected; and one or more pressurization devices such that positive pressure is applied to at least a portion of the system.

These and other features and advantages of the disclosure will be set forth or will become more fully apparent in the description that follows and in the appended claims. The features and advantages can be realized and obtained by means of the instruments and combinations particularly pointed out in the appended claims. Furthermore, the features and advantages described herein can be learned by the practice of the disclosure or will be apparent from the description, as set forth hereinafter.

BRIEF DESCRIPTION OF THE FIGURES

FIG. 1 is a system schematic showing the system for controlled solid oil field chemical delivery.

DETAILED DESCRIPTION OF THE INVENTION

Systems, apparatus, and methods provide for removing, inhibiting, and/or decreasing foulants, corrosives, and/or contaminants precipitated or deposited in oilfield tubulars, pipelines, fittings, wellheads, and the like. Various systems, apparatus and methods utilize a chemical delivery apparatus and chemicals that are generally solid at ambient temperatures and pressures (approximately 20° C. and 1 atm) and that can be reduced in size and injected by the chemical delivery apparatus into the oilfield tubular at the site of use. The on-site in-line solid chemical size reduction allows for a more accurate and reduced overall use of chemicals. Thus, the need for shipping large volumes of liquid chemicals and solvents can be greatly eliminated, providing a safer and more efficient and economical manner of oilfield remediation than possible with current methods. For example, transportation costs related to the solid chemical can be reduced by as much as about 95%.

For example, there is provided herein a system for preventing, inhibiting or decreasing precipitation and/or deposition of undesirable matter in oilfield tubulars. The system is for on-site particle size reduction and in-line delivery of a solid chemical into oilfield fluid streams. The system comprises a solid chemical tank, a solid chemical size reduction apparatus at the exit of the solid chemical tank to produce a size-reduced solid chemical, a valve for controlling the distribution rate of the size-reduced solid chemical, a solid chemical injection point wherein the size-reduced solid chemical is injected into an oilfield production line, and one or more pressurization devices such that positive pressure is applied to the system.

Controlled discharge of the solid chemical into an oilfield fluid stream can be performed for preventing, decreasing, or inhibiting foulant and/or contaminant deposition and/or precipitation and/or corrosion in oilfield tubulars and surface equipment. The solid chemical used is a paraffin inhibitor, an asphaltene inhibitor, a corrosion inhibitor, a scale inhibitor or a foam inhibitor, an emulsion breaker, a hydrate inhibitor, a chemical additive for enhanced oil recovery, or a combination thereof.

The solid chemical can comprise less than 25 vol. % solvent.

Further, a method of on-site particle size reduction and in-line delivery of a solid chemical into an oilfield fluid stream is disclosed. The method comprises providing an amount of size-reduced solid chemical. The composition of the solid chemical is suitable in crude oil applications to remediate, inhibit and/or decrease precipitation, corrosion, or deposits of foulants and/or contaminants to maintain or restore flow in oilfield tubulars, fittings, wellheads, wellbores, and the like.

The method further comprises loading an amount of solid chemical into an open interior volume of a chemical tank that is located proximate to an injection point that provides access to the oilfield fluid stream. The solid chemical tank includes a tank outlet and the open interior volume.

The method further includes applying pressure upon at least a portion of the solid chemical in the open interior volume using a pressure component. The applied pressure aids in passing the solid chemical through the system. Increased pressure can further be applied to reduce the energy required to reduce the size of the solid chemical in the solid chemical reduction apparatus.

Further, the solid chemical tank, solid chemical tank outlet, solid chemical size reduction apparatus, and valve are interconnected and part of a chemical delivery apparatus. The chemical delivery apparatus can further comprise the pressure component, the pressure component being operably connected to the solid chemical tank.

The systems and methods above can include one or more of the following aspects: the solid chemical is a paraffin inhibitor, an asphaltene inhibitor, a corrosion inhibitor, a scale inhibitor or a foam inhibitor, a chemical additive, an emulsion breaker or a hydrate inhibitor; the solid chemical comprises less than 25% solvent.

A chemical delivery apparatus can also be used in combination with a solid chemical for preventing, inhibiting or decreasing precipitation of solids and contaminants in oilfield tubulars. The apparatus comprises: (i) a solid chemical tank, the solid chemical tank including an inlet, an open interior portion and an outlet; (ii) a pressure component for pressurizing the solid chemical tank or applying pressure to a portion of the solid chemical tank contents; (iii) solid chemical size reduction apparatus for reducing the size of the solid chemical in the solid chemical tank; and (iv) a valve in communication with the solid chemical tank for controlling flow and discharge of size-reduced solid chemical.

The components of the solid chemical tank, size reduction apparatus, valve, pressure component, and injection point can be interconnected and contained in a frame assembly providing a self-contained unit. The self-contained unit can further include a skid component and/or be made to be portable. In operation, the pressure component pressurizes the solid chemical tank holding a solid chemical or applies pressure to a portion of the chemical and the size reduction apparatus reduces the size of the solid chemical via mechanical means.

As described herein, the solid chemical tank can be cylindrical in shape. The solid chemical tank can be formed of metal, a metal alloy, such as steel, a glass, a ceramic material, a polymer, such as, but not limited to, polyethylene, polymer mixtures, or a combination thereof. The chemical tank can also be equipped with a charging port through which solid chemical can be poured into the chemical tank.

The valve can be any suitable valve. Examples include a metering valve, pneumatic valve, a solenoid valve, a hydraulic valve, a flow controller or the like.

As described herein, the solid chemical size reduction apparatus can comprise one or more of an impact crusher, a grinder, a shaver, an electrical/pneumatic saw, a cutting wire, a pulverizer, a mechanical gear, a pin mill, a stud mill, a cage mill, a hammer mill, a ball mill, a rod mill, a cone mill, a disc mill, a turbo mill, a counter-rotating mill, a beater mill, a tooth disc mill, a mechanical impact mill, a jet mill, an attrition mill, a granulator, a grinder, a blade, a shank, a knife edge, a shaper, or a combination thereof, or any other means for reducing the size of the solid chemical.

As described herein, the pressure component can be a pump, a compressor, a high pressure gas cylinder, a high pressure gas line, a hydraulic pump, a mechanically driven piston, a pneumatic piston, a fluidic piston, a screw, an electromagnetic piston, or any other suitable means of applying pressure.

Foulants can include paraffins, asphaltenes, corrosive products, minerals that cause scale, foam caused by dispersed gas bubbles, or a mixture thereof.

Examples of the solid chemical stored in the solid chemical tank useful in inhibiting, preventing, or decreasing foulants comprise a paraffin inhibitor, an asphaltene inhibitor, a corrosion inhibitor, a scale inhibitor, a hydrate inhibitor, a biocide, an emulsion breaker, a defoamer, a foamer, a water clarifier, or a combination thereof.

Paraffin inhibitors comprise, but are not limited to, ethylene-vinyl acetate copolymers, olefin-maleic anhydride copolymers and their esters, polyacrylates, alkylphenol-formaldehyde resins, and a combination thereof. Suitable paraffin inhibitors can include, but are not limited to, paraffin crystal modifiers and dispersant/crystal modifier combinations. Suitable paraffin crystal modifiers include, but are not limited to, alkyl acrylate copolymers, alkyl acrylate vinylpyridine copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

Asphaltene inhibitors include, but are not limited to, succinic anhydride derivatives, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, polyisobutylene succinic anhydride, and a combination thereof.

Corrosion inhibitors include, but are not limited to, an imidazoline compound, a quaternary amine compound, a pyridinium compound, or a combination thereof. The corrosion inhibitor can comprise an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (I) or an imidazoline derivative. Representative imidazoline derivatives include an imidazolinium compound of Formula (II) or a bis-quaternized compound of Formula (III).

The corrosion inhibitor can include an imidazoline of Formula (I):

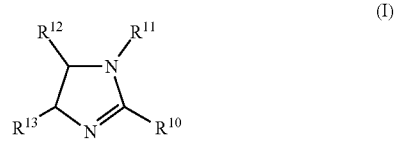

wherein $R^{10}$ is a $C_1$-$C_{20}$ alkyl or a $C_1$-$C_{20}$ alkoxyalkyl group; $R^{11}$ is hydrogen, $C_1$-$C_6$ alkyl, $C_1$-$C_6$ hydroxyalkyl, or $C_1$-$C_6$ arylalkyl; and $R^{12}$ and $R^{13}$ are independently hydrogen or a $C_1$-$C_6$ alkyl group. Preferably, the imidazoline includes an $R^{10}$ which is the alkyl mixture typical in tall oil fatty acid (TOFA), and $R^{11}$, $R^{12}$ and $R^{13}$ are each hydrogen.

The corrosion inhibitor can include an imidazolinium compound of Formula (II):

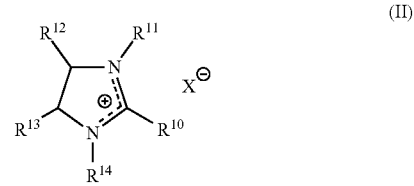

wherein $R^{10}$ is a $C_1$-$C_{20}$ alkyl or a $C_1$-$C_{20}$ alkoxyalkyl group; $R^{11}$ and $R^{14}$ are independently hydrogen, $C_1$-$C_6$ alkyl, $C_1$-$C_6$ hydroxyalkyl, or $C_1$-$C_6$ arylalkyl; $R^{12}$ and $R^{13}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The corrosion inhibitor can comprise a bis-quaternized compound having the formula (III):

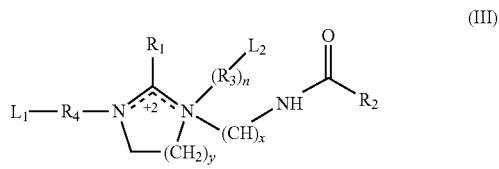

wherein $R_1$ and $R_2$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof; $R_3$ and $R_4$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof; $L_1$ and $L_2$ are each independently absent, H, —COOH, —SO$_3$H, —PO$_3$H$_2$, —COOR$_5$, —CONH$_2$, —CONHR$_5$, or —CON(R$_5$)$_2$; $R_5$ is each independently a branched or unbranched alkyl, aryl, alkylaryl, alkylheteroaryl, cycloalkyl, or heteroaryl group having from 1 to about 10 carbon atoms; n is 0 or 1, and when n is 0, $L_2$ is absent or H; x is from 1 to about 10; and y is from 1 to about 5. Preferably, $R_1$ and $R_2$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R_3$ and $R_4$ are $C_1$-$C_{10}$ alkylene, $C_2$-$C_8$ alkylene, $C_2$-$C_6$ alkylene, or $C_2$-$C_3$ alkylene; n is 0 or 1; x is 2; y is 1; $R_3$ and $R_4$ are —$C_2H_2$—; $L_1$ is COOH, —$SO_3H$, or —$PO_3H_2$; and $L_2$ is absent, H, —COOH, —$SO_3H$, or —$PO_3H_2$. For example, $R_1$ and $R_2$ can be derived from a mixture of tall oil fatty acids and are predominantly a mixture of $C_{17}H_{33}$ and $C_{17}H_{31}$ or can be $C_{16}$-$C_{18}$ alkyl; $R_3$ and $R_4$ can be $C_2$-$C_3$ alkylene such as —$C_2H_2$—; n is 1 and $L_2$ is COOH or n is 0 and $L_2$ is absent or H; x is 2; y is 1; $R_3$ and $R_4$ are —$C_2H_2$—; and $L_1$ is COOH.

It should be appreciated that the number of carbon atoms specified for each group of formula (III) refers to the main chain of carbon atoms and does not include carbon atoms that may be contributed by substituents.

The corrosion inhibitor can comprise a bis-quaternized imidazoline compound having the formula (III) wherein $R_1$ and $R_2$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R_4$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is COOH, —$SO_3H$, or —$PO_3H_2$; and $L_2$ is absent or H. Preferably, a bis-quaternized compound has the formula (III) wherein $R_1$ and $R_2$ are each independently $C_{16}$-$C_{18}$ alkyl; $R_4$ is —$C_2H_2$—; x is 2; y is 1; n is 0; $L_1$ is —COOH, —$SO_3H$, or —$PO_3H_2$ and $L_2$ is absent or H.

The corrosion inhibitor can be a quaternary ammonium compound of Formula (IV):

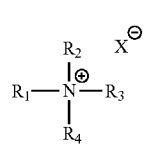

(IV)

wherein $R_1$, $R_2$, and $R_3$ are independently $C_1$ to $C_{20}$ alkyl, $R_4$ is methyl or benzyl, and $X^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula [$N^+R^{5a}R^{6a}R^{7a}R^{8a}$][$X^-$] wherein $R^{5a}$, $R^{6a}$, $R^{7a}$, and $R^{8a}$ contain one to 18 carbon atoms, and X is Cl, Br or I. For the quaternary salts, $R^{5a}$, $R^{6a}$, $R^{7a}$, and $R^{8a}$ can each be independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula [$N^+R^{5a}R^{6a}R^{7a}R^{8a}$][$X^-$] wherein $R^{5a}$, $R^{6a}$, $R^{7a}$, and $R^{8a}$ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The corrosion inhibitor can comprise a pyridinium salt such as those represented by Formula (V):

(V)

wherein $R^9$ is an alkyl group, an aryl group, or an arylalkyl group, wherein said alkyl groups have from 1 to about 18 carbon atoms and $X^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The corrosion inhibitors can include additional corrosion inhibitors such as phosphate esters, monomeric or oligomeric fatty acids, or alkoxylated amines.

The corrosion inhibitor can comprise a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a more broad distribution of alkyl phosphate esters. Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor can include a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The corrosion inhibitor can comprise an alkoxylated amine. The alkoxylated amine can be an ethoxylated alkyl amine. The alkoxylated amine can be ethoxylated tallow amine.

Scale inhibitors include, but are not limited to, inorganic polyphosphates, organic phosphates, phosphate esters, organic phosphonates, organic amino phosphates, phosphoric acids, phosphonates, phosphonic acids, polyacrylamides, hydrophobically modified polyacrylamide, salts of acrylamidomethyl propane sulfonate/acrylic acid copolymer (AMPS/AA), phosphinated maleic copolymer (PHOS/MA), salts of a polymaleic acid/acrylic acid/acrylamidomethyl propane sulfonate terpolymer (PMA/AA/AMPS), organic polymers, sodium gluconate, and a combination thereof.

Foam inhibitors include, but are not limited to, polysiloxanes, polyvinylalkoxysilanes, polyvinylalkylalkoxy silanes, and a combination thereof.

Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins.

Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

Water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

The system as described herein, wherein the solid chemical comprises a water soluble polymer for enhanced oil recovery.

The system as described herein, where in the polymer for enhanced oil recovery is selected from the group consisting of polyacrylamide (PAM) and hydrophobically modified polyacrylamide (HM-PAM).

Use and application of the systems, apparatus, and methods provide advantages in the areas of dosage accuracy, efficiency, safety and costs related to materials, equipment and labor. These systems and methods eliminate the need for shipping and storing large volumes of liquid chemicals, providing for a safer and more efficient and economical manner of oil well remediation than is possible with current methods. For example, in some instances, the transportation costs related to the amount of chemical shipped can be reduced by up to 95%. The solid chemical size reduction and discharging of the solid chemical can be performed contemporaneously for as long as is required for sufficient dosing, reducing stoppages. The solid chemical tank can be refilled with solid chemical if needed. For example, the solid chemical tank can be refilled through a charging port. The valve regulated flow of the chemical allows for controlled and accurate dosages, increasing accuracy and efficiency. The valve assembly can further provide the user with current information regarding volumes discharged and volumes available. The continuous particle size reduction further provides economic benefit in that energy use is kept at a minimum, since stoppages in flow and/or inefficient flow is greatly reduced by utilizing reduced solid chemical size; and in that the user can reduce the size of only the volume of inhibitor to be injected in the immediate future. This significantly reduces energy requirements, as opposed to maintaining a whole solid chemical tank of size-reduced solid chemicals. If, after use, there remains unused size-reduced chemical, since the chemical is in solid form, absent substantive solvent content, it can be safely stored in the solid chemical tank, without waste or degradation of the chemical.

For the purposes of this disclosure, like reference numerals in the FIGURES shall refer to like features unless otherwise indicated and like named elements in the FIGURES, though having differing reference numerals in respectively differing FIGURES, shall refer to like features unless otherwise indicated.

Disclosed herein are apparatus and methods for removing, reducing and/or inhibiting foulant deposits in oilfield tubulars. Particularly, provided is a chemical delivery apparatus used to reduce the size of chemicals used as inhibitors (or any other type of oilfield chemical that can be manufactured as a solid and reduced in size) on-site, and introduce the size-reduced solid chemical into the flow of an oilfield tubular, wellhead and/or pipeline. Specific methods and materials are described herein, although methods and materials similar or equivalent to those described herein can be used in practice or testing.

Referring to FIG. 1, there is shown a system for controlled solid oil field chemical delivery comprising a solid chemical tank 100 having a body wall defining an open interior volume adapted to receive and hold an amount of a solid chemical 104 and a pressure component 102 connectable and/or connected to the solid chemical tank 100 and adapted to pressurize the receptacle and/or apply physical pressure to the solid chemical 104 and/or the size-reduced solid chemical. Loaded solid chemicals 104 can be held and stored for later use, or prepared for immediate use. The solid chemical tank 100 further comprises an outlet 106 adapted for removing the solid chemical 104 and passing the solid chemical through solid chemical size reduction apparatus 108. In solid chemical size reduction apparatus 108 the solid chemical is reduced in size and is preferably reduced to the size of powder (i.e. having an average particle diameter no greater than about 100 microns, no greater than about 500 microns, or no greater than about 1 millimeter), forming a size-reduced solid chemical. The size-reduced solid chemical is then passed through valve 110 in a manner so as to control the amount of size-reduced solid chemical flowing to the oil field stream and/or production line 114. Valve 110 can alternatively be referred to in other portions of this application as a solid chemical metering valve. The size-reduced solid chemical is injected into the oil field stream and/or production line 114 at chemical injection point 112.

In use, the solid chemical tank 100 may be loaded with a solid chemical 104 through a charging port (not shown) and into the open interior portion. The charging port can have a seal that closes the inlet, allowing the open interior portion to be pressurized. The charging port can be connected to a remote source of solid chemical via a feeding conduit.

While the example shown in FIG. 1 illustrates a compact apparatus, those of skill in the art will appreciate that the system can be modified and adapted to include further configurations and features not shown. Among other features, the solid chemical tank can have any configuration that is operable for the method described herein.

In addition, it should be noted that the valve 110 can also comprise a flow controller. In use, valve 110, can be any appropriate valve, such as a metering valve or flow controller, for controlling the flow of and/or accurately measuring the amount of size-reduced solid chemical (such as, for example, paraffin inhibitor, asphaltene inhibitor or the like) directed to the oil field stream and/or production line. Those of skill in the art will also appreciate that; while a pressure component 102 can be desirable, it can be unnecessary in some cases, depending on the particular application required. Gravity and/or a downstream device applying negative pressure (vacuum) can be used to maintain flow through the system.

The pressure component 102 can be adapted to comprise a valve, for example a metering valve, in addition to, or instead of, valve 110 downstream. Such a valve incorporated into the pressure component can be adapted to control or meter applied pressure within the solid chemical tank used in driving the solid chemical into and through the solid chemical size reduction apparatus 108.

It should be further noted that the positioning and/or combination of components can be altered as per specific design requirements.

Pressurization System

The one or more pressurization devices are used to apply a pressure to at least a portion of the chemical and the overall system to achieve a pressure at the chemical injection point superior to that of the production line.

The one or more pressurization devices can be selected from a pump, a compressor, a high pressure gas cylinder, a high pressure gas line, a pneumatic piston, a fluidic piston, an electromagnetic piston, a screw, or any other device able to apply pressure. The one or more pressurization devices are not necessarily comprised of a single element and could be composed of various components as well as lubricating and/or compression fluids. The one or more pressurization devices are not necessarily confined to the section of the system directly upstream of the solid chemical tank and can extend to various other sections, such as the solid chemical tank itself for instance. The one or more pressurization devices can be constructed and arranged to apply pressure upon the solid chemical, size-reduced solid chemical, or both so as to effectuate injection of the chemical at the injection point.

The one or more pressurization devices can optionally be present before the solid chemical tank.

Chemical Tank

The solid chemical tank can be used for storage of the chemical in its solid phase prior to injection into the tubular, pipeline, wellhead, etc. The receptacle in down-time and in use can be exposed to local ambient temperature, which can be extreme.

The solid chemical tank is a tank which can be cylindrical in shape. The tank can be formed of metal, a metal alloy, such as steel, a glass, a ceramic material, a polymer, such as, but not limited to, polyethylene, polymer mixtures, or a combination thereof.

The tank can have various capacities, including, but not limited to, about 5 L, about 100 L, about 1,000 L, about 5,000 L, about 10,000 L, about 50,000 L, about 1 to about 100 L, about 100 L to about 1,000 L, or about 1,000 L to about 50,000 L.

Size Reduction Apparatus

The solid chemical size reduction apparatus reduces the size of the solid chemical originating from the solid chemical tank.

The solid chemical size reduction apparatus can comprise various mechanical and/or non-mechanical means for reducing the size of the solid chemical. For example, the solid chemical size reduction apparatus can comprise an impact crusher, a shaver, an electrical/pneumatic saw, a cutting wire, a pulverizer, an extruder, a scraper, a mechanical gear, a pin mill, a stud mill, a cage mill, a hammer mill, a ball mill, a rod mill, a cone mill, a disc mill, a turbo mill, a counter-rotating mill, a beater mill, a tooth disc mill, a mechanical impact mill, a jet mill, an attrition mill, a granulator, a grinder, a shaper, or a combinations thereof.

The solid chemical size reduction apparatus can comprise a blade, a shank, a knife edge, or a combination thereof.

The solid chemical size reduction apparatus can reduce the solid chemical to a powder (i.e. having an average particle diameter no greater than about 100 microns, no greater than about 500 microns, or no greater than about 1 millimeter).

The solid chemical size reduction apparatus can produce size-reduced solid chemicals having an average particle diameter of about 1 micron, about 10 microns, about 100 microns, about 1 millimeter, about 2 millimeters, or about 5 millimeters. The solid chemical size reduction apparatus can produce size-reduced solid chemicals having an average particle diameter between about 1 micron and about 10 millimeters, between about 1 micron and about 5 millimeters, between about 1 micron and about 2 millimeters, between about 1 micron and about 1 millimeter, between about 1 micron and about 500 microns, between about 1 micron and about 100 microns, between about 10 microns and about 10 millimeters, between about 10 microns and about 5 millimeters, between about 10 microns and about 2 millimeters, between about 10 microns and about 1 millimeter, between about 10 microns and about 500 microns, between about 10 microns and about 100 microns, or between about 10 micron and about 50 microns.

Metering Valve

The valve is a device or portion adapted for halting or controlling the flow of size-reduced solid chemical through the chemical injection point. The valve enables injection of the size-reduced solid chemical into the production line at an accurate dosage which can be adjusted as desired.

A valve can be placed at any point downstream of the solid chemical size reduction apparatus. For example, injection of the size-reduced solid chemical into the production line can be controlled using a metering device positioned at the exit of the solid chemical tank and a valve positioned downstream, either as part of the injection apparatus or of the targeted production line, such as a check valve. The valve can be placed at or immediately adjacent to the injection point to reduce the overall pressure drop between the solid chemical tank and the injection point.

The valve can be any suitable valve. The valve can be manual or automatic such as, for example, a metering valve, pneumatic valve, a solenoid valve, a hydraulic valve, a flow controller, or the like.

Wherein the valve is a metering valve, the metering valve can be a part of or incorporated into the pressure component.

Where the pressure component is a physical pressure component, the metering valve controls or monitors the pressure component as it physically drives solid chemical into the solid chemical size reduction apparatus and through the system. Where the pressure component is a fluid/gas pressurization system, the metering valve controls or monitors the pressure component as it pressurizes the solid chemical tank, driving chemical into the solid chemical size reduction apparatus and through the system.

Preferably, the valve is located as close to the solid chemical injection point as practical. For example, the valve can be located less than about 3 cm, less than about 15 cm, less than about 35 cm, less than about 70 cm, or less than about 6 m from the solid chemical injection point.
Chemical The chemical or chemical package is a product introduced into tubular systems and/or surface equipment of oilfields for preventing, inhibiting and/or decreasing inline foulant/contaminant precipitation and/or deposition. The chemical is manufactured as a solid, examples of which include, but are not limited to, flakes, pellets and sticks. Examples of solid chemicals include those that can be transported and stored, including in the solid chemical tank, in solid phase at ambient temperature and pressures (approximately 20° C. and 1 atm). Solid chemicals can further include any suitable chemical material that is capable of flowing from the exit of the solid chemical tank while maintaining the ability to be reduced in size in the solid chemical size reduction apparatus. Examples of such chemicals can include paraffin inhibitors, aspahltene inhibitors, corrosion inhibitors, scale inhibitors, paraffin dispersants, aspahltene dispersants, hydrate inhibitors, emulsion breakers, foamers, water clarifiers, corrosion inhibitors, chemical additives, or a combination thereof. Throughout this application, "solid chemicals" are understood to encompass chemicals in solid phase at ambient temperature and pressure, as well as chemicals capable of flowing from the exit of the solid chemical tank while maintaining the ability to be reduced in size, as set forth above.

The solid chemical can be a paraffin inhibitor. Suitable examples of paraffin inhibitors include, but are not limited to: ethylene-vinyl acetate copolymers, olefin-maleic anhydride copolymers and their esters, polyacrylates, alkylphenol-formaldehyde resins, and a combination thereof.

The solid chemical can also be an asphaltene inhibitor, suitable examples of which include alkylphenol resins, polyisobutylene, succinic anhydride derivatives and a combination thereof.

The solid chemical can be a scale inhibitor, suitable examples of which include inorganic polyphosphates, organic phosphate esters, organic phosphonates, organic amino phosphates, organic polymers, sodium gluconate, and a combination thereof.

The solid chemical can be a corrosion inhibitor, suitable examples of which include imidazolines, and quaternary amines, such as, for example, benzalkonium chloride, tetraethylammonium bromide, and thiosemicarbazide.

Those of skill in the art will appreciate that the problem of deposition of contaminants and/or foulants (e.g., paraffin, asphaltene, scale, etc.) occurs not only within tubulars and pipelines but also in production equipment, valves, fittings, and the wellbore itself. As such, the exact location of the injection point of the use of methods and systems can be anywhere that is prone to foulant/contaminant buildup depending on the particular operating conditions of any specific well, the composition of particular crude or condensate, as well as the refinery oil's source and process design. Those of skill in the art will also appreciate that the solid chemical can be any solid chemical which is adaptable to the method and which can be useful in oil extraction, oilfield production and refinery processes, such as paraffin inhibitors, asphaltene inhibitors, corrosion inhibitors, salt inhibitors, scale inhibitors, gas hydrate inhibitors, and the like.

In use, the systems and methods use solid chemistry that is automatically stable at least to about −40° C. with an upper range of stability of at least about 40° C., or from about −40° C. to about 50° C., or from about −40° C. to about 60° C. Stability is understood to mean that no significant phase separation occurs at a given temperature. As the chemical is solid, the chemical can be stored over longer periods of time without volatile solvents and maintain stability. The solid chemical can comprise less than about 15 vol. % solvent.

The solid chemical can have a total solvent content of less than about 1 vol. %, less than about 10 vol. %, less than about 30 vol. %, or less than about 50 vol. %.

The chemical is deposited into the solid chemical tank, where it can be stored until application. In application, the chemical is fed, under pressure if necessary, into the solid chemical size reduction apparatus section of the system by gravity, an auger, or any other suitable means. The solid chemical size reduction apparatus section of the system reduces the size of the solid chemical by mechanical or other means. The size-reduced solid chemical is then introduced into the production line at a rate dictated by the valve (e.g., metering valve/flow controller).

A chemical delivery unit for on-site solid chemical size reduction and injection of the size-reduced solid chemical into the production stream of a production or transmission line of an oilfield for inhibiting precipitation contaminants and/or foulants is provided. The chemical delivery unit comprises: i) a frame assembly; ii) a solid chemical tank fixed to the frame assembly, the solid chemical tank portion being adapted to be pressurized and/or for physical pressure to be applied; iii) a solid chemical size reduction apparatus in communication with the solid chemical tank; and iv) a discharge port fixed to the frame assembly downstream and in communication with the solid chemical size reduction apparatus. The chemical delivery unit is adapted to enable a user to portably move the chemical delivery unit into a position adjacent and releasably operably couple it to a tubular, providing communication between the chemical delivery unit and the production stream; and, in a continuous manner, reducing the size of an amount of the solid chemicals being held in the solid chemical tank by exposure to the solid chemical size reduction apparatus, and injecting the size-reduced solid chemical under pressure through the injection point, into the production stream.

The chemical delivery unit can further comprise a valve positioned downstream of the solid chemical size reduction apparatus, enabling discharge of the size-reduced solid chemicals in predetermined doses into the production stream.

The chemical delivery unit can further comprise a pressure system adapted for pressurizing the solid chemical tank or applying physical pressure to solid chemical tank contents. The chemical delivery unit can further include a coupling mechanism for operable coupling to an injection portion of the tubular.

A chemical delivery apparatus (unit-assembly) for on-site solid chemical size reduction (size reduction) and injecting (delivering) of a solid chemical into the production stream of a production or transmission line of an oilfield for inhibiting precipitation/deposition foulants in the production and/or transmission line is also provided. The chemical delivery apparatus comprises: a frame assembly; a solid chemical tank fixed to the frame assembly, the solid chemical tank being adapted to be pressurized and/or for physical pressure to be applied; a solid chemical size reduction apparatus fixed to the frame assembly and in communication with the solid chemical tank; and a discharge port downstream and in communication with the solid chemical tank and the solid chemical size reduction apparatus. The chemical delivery apparatus is adapted to be portably moved into a position adjacent and releasably operably coupled to a tubular containing the production stream, providing communication between the discharge port and the production stream; and, in a continuous manner, to reduce solid chemical size and inject, under pressure, an amount of solid chemicals loaded in the receptacle portion through the discharge port, into the production stream.

A self-contained unit for reducing a solid phase chemical package size and introduction of the solid phase chemical package formulated for inhibiting precipitation/deposition foulants into oilfield production or transmission lines is disclosed. The self-contained unit comprises a frame assembly containing therein: a solid chemical size reduction portion, the solid chemical size reduction portion being adapted to be pressurized and/or apply physical pressure and configured to receive the solid phase chemical package to be reduced in size therein; an injection path for injecting the size-reduced chemical package; and a discharge port adapted to be sealingly and releasably operably coupled to a tubular containing the production stream of an oilfield production or transmission line. The self-contained unit can be adapted to be portable.

A chemical additive injection kit is also provided. The chemical additive injection kit comprises a chemical injection unit comprising: a frame assembly; a solid chemical tank adapted for receiving a solid phase chemical package and for pressurization or the application of pressure on at least a portion of solid chemical tank contents; a solid chemical size reduction portion, the solid chemical size reduction portion being adapted to reduce the size of the solid phase chemical package; an injection path for injecting the size-reduced chemical package; and a discharge port adapted to be sealingly and releasably coupled to a tubular containing the production stream of an oilfield production or transmission line. The chemical additive injection kit, when assembled, is adapted to be used with a chemical package in solid state formulated for inhibiting precipitation/deposition foulants in the production and/or transmission line. The chemical additive injection kit further comprises instructions for using the chemical injection unit in inhibiting precipitation/deposition foulants in oilfield production and/or transmission lines with said chemical injection unit and chemical package.

The chemical additive injection kit can further comprise instructions to load a solid chemical package into the solid chemical tank, reduce the size of the chemical package in the solid chemical size reduction portion, and inject an effective amount of the size-reduced solid chemical package, under pressure, through the discharge port, into the production stream of an oilfield production or transmission line to inhibit precipitation of foulants and/or contaminants.

A commercial package is also described. The commercial package comprises: a solid chemical comprising an oilfield production additive for introduction into a tubular flow; and labeling having printed instructions indicating the use thereof as a precipitation/deposition foulant inhibitor for an oilfield production or transmission line. The commercial package further comprises instructions for use.

The commercial package comprises: a paraffin inhibitor, an asphaltene inhibitor, a corrosion inhibitor, a scale inhibitor, a foam inhibitor, or a combination thereof.

A method of marketing a solid chemical is also provided, the method comprising packaging the solid chemical along with labeling that identifies solid chemical as being useful to inhibit precipitation of foulants and/or contaminants, such as described herein, in oilfield production or transmission lines or surface equipment.

The present disclosure further includes use of the chemical injection system disclosed herein in various other industrial processes requiring chemical injection. Such processes include, but are not limited to, the use and methods of using the chemical injection system disclosed herein for chemical injection in paper manufacturing, water treatment, crude oil refining, and the petrochemical industry.

Unless otherwise defined herein, all technical and scientific terms used herein have the same meaning as commonly understood by one of ordinary skill in the art. In case of conflict, the present document, including definitions, will control. The following definitions are provided to determine how terms used in this application are to be construed. The organization of the definitions is for convenience only and is not intended to limit any of the definitions to any particular category.

"Flow line" as used herein refers to the surface pipe through which oil or gas travels from a well to processing equipment or to storage.

"Inhibitor/dispersant" as used herein refers to a chemical or composition that prevents or reduces contaminant precipitation from a crude oil and/or deposition of contaminants or foulants on surfaces in contact with a crude oil, or a chemical used to help in the removal of a contaminant or foulant deposit already formed on a surface.

"Deposition" as used herein refers to the coating of agglomerated materials on the surface of a material, such as an interior wall of a pipe or tubing.

"Precipitation" as used herein refers to the agglomeration of solids which can remain suspended in the bulk fluid fraction, or settle down by gravity, but do not physically attach to any surface.

"Skid" as used herein refers to a wood, polymer (plastic), or metal platform and/or frame sometimes supported on wheels, legs, or runners used for handling and moving various apparatus.

"Tubular" or "Tubulars" as used herein refers to any type of oilfield pipe or oilfield tubular goods, such as drill pipe, drill collars, pup joints, casing, production tubing/line and pipeline or line pipe. The term includes standard and line pipe used in the oil and gas, pipeline, construction, refining, chemical and petrochemical industries for production and transmission of crude oil, natural gas and petroleum products as well as for water and slurry pipeline applications.

"Oilfield" as used herein refers to the surface area overlying an oil reservoir or reservoirs, and the reservoir(s), well(s) and production equipment associated therewith.

"Pipeline" as used herein refers to a tube or system of tubes used for transporting crude oil and natural gas from the field or gathering system to the refinery.

"Production" refers to the phase of the petroleum industry that deals with bringing well fluids or gas to the surface and separating them and storing, gauging and otherwise preparing the product for delivery; also can refer to the amount of oil or gas produced in a given period.

"Production tubing" as used herein refers to a wellbore tubular used to produce reservoir fluids. Production tubing is assembled with other completion components to make up the production string. The production tubing selected for any completion should be compatible with the wellbore geometry, reservoir production characteristics and reservoir fluids.

"Valve" or "Valve component" refers to any device for halting or controlling the flow of a solid, liquid, gas or other material through a passage, pipe, inlet, outlet, etc.

"Wellbore" refers to a borehole; the hole drilled by the bit. A wellbore can have casing in it or it can be open (uncased); or part of it can be cased, and part of it can be open; also called well, borehole, or hole.

"Wellhead" refers to the equipment installed at the surface of the wellbore. A wellhead includes such equipment as the casing head and tubing head.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

Any patents or publications referenced in this disclosure are herein incorporated to the extent they describe the chemicals, materials, instruments, statistical analyses, and methodologies which are reported in the patents and publications which might be used in connection with the invention or which can expand the understanding and scope of the embodiments and claims of the presently disclosed invention. Referenced and incorporated patents and applications include:

| U.S. Pat. No. | U.S. Pat. No. | U.S. Pat. No. | U.S. Pat. No. |
| --- | --- | --- | --- |
| 7,857,871 | 7,670,993 | 7,541,315 | 7,493,955 |
| U.S. Pat. No. | U.S. Pat. No. | U.S. Pat. No. | U.S. Pat. No. |
| 7,455,111 | 6,491,824 | 6,111,261 | 4,518,509 |
| U.S. Pat. No. 9,574,981 | | Chinese patent no. 1487048 Titled: Solid wax resisting scale inhibitor for well | |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. A system for distribution of a solid chemical into an oil field production line, comprising:
    a solid chemical tank wherein at least a portion of the solid chemical is contained therein;
    a solid chemical size reduction apparatus wherein the solid chemical size reduction apparatus reduces the size of the solid chemical flowing from an outlet of the solid chemical tank, thereby producing a size-reduced solid chemical;
    a valve for controlling the distribution rate of the size-reduced solid chemical flowing from the solid chemical size reduction apparatus into the oil field production line;
    a solid chemical injection point on the oil field production line wherein the size-reduced solid chemical is injected; and
    one or more pressurization devices selected from the group consisting of a pump, a compressor, a high pressure gas cylinder, a high pressure gas line, a pneumatic piston, a fluidic piston, an electromagnetic piston, and a screw such that positive pressure is applied to at least a portion of the system for injecting the size-reduced solid chemical into the oil field production line;
    wherein the solid chemical is selected from the group consisting of a paraffin inhibitor, an asphaltene inhibitor, a corrosion inhibitor, a scale inhibitor, a foam inhibitor, an emulsion breaker, a hydrate inhibitor, a polymer for enhanced oil recovery, and a combination thereof.

2. The system of claim 1 wherein the solid chemical size reduction apparatus is selected from the group consisting of a grinder, a shaver, an electrical/pneumatic saw, a cutting wire, a pulverizer, an extruder, a scraper, a mechanical gear, and a shaper.

3. The system of claim 1 wherein the valve comprises a metering valve or a flow controller.

4. The system of claim 1 wherein the valve is less than about 6 m from the solid chemical injection point.

5. The system of claim 1 wherein at least one of the one or more pressurization devices is present before the solid chemical tank.

6. The system of claim 1 wherein the solid chemical tank is maintained at about ambient temperature.

7. The system of claim 1 wherein the solid chemical is in the form of pellets, sticks, flakes, a solid block, a powder, or a combination thereof.

8. The system of claim 1 wherein the solid chemical comprises a water soluble polymer for enhanced oil recovery selected from the group consisting of polyacrylamide (PAM) and hydrophobically modified polyacrylamide (HM-PAM).

9. The system of claim 1 wherein the solid chemical comprises a paraffin inhibitor selected from the group consisting of an ethylene-vinyl acetate copolymer, an olefin-maleic anhydride copolymer or an ester thereof, a polyacrylate, an alkylphenol-formaldehyde resin, and a combination thereof.

10. The system of claim 1 wherein the solid chemical comprises an asphaltene inhibitor comprising an alkylphenol formaldehyde resin.

11. The system of claim 1 wherein the solid chemical comprises a corrosion inhibitor selected from the group consisting of an imidazoline, a quaternary amine, a pyridine, and a combination thereof.

12. The system of claim 1 wherein the solid chemical comprises a scale inhibitor selected from the group consisting of an inorganic polyphosphate, an organic phosphate ester, an organic phosphonate, an organic amino phosphate, an organic polymer, sodium gluconate, and a combination thereof.

13. The system of claim 1 wherein the solid chemical comprises a foam inhibitor selected from the group consisting of a polysiloxane, a polyvinylalkoxysilane, a polyvinylalkylalkoxy silane, and a combination thereof.

14. The system of claim 1 wherein the solid chemical size reduction apparatus produces the size-reduced solid chemical having an average particle diameter between about 1 micron and about 1 millimeter.

15. The system of claim 1 wherein the size-reduced solid chemical flowing to the oil field production line have a total solvent content of less than about 30 vol. %.

16. The system of claim 1 wherein the chemical tank is equipped with a charging port through which the solid chemical can be poured into the solid chemical tank.

17. A method for distribution of the solid chemical into an oil field production line comprising the system of claim 1, wherein the valve is manipulated such that a predetermined amount of the size-reduced solid chemical is distributed into the oil field production line.

18. A method for continuous distribution of the solid chemical into an oil field production line comprising the system of claim 1, wherein the valve is manipulated such that a predetermined amount of the size-reduced solid chemical is continuously distributed into the oil field production line.

* * * * *